Jan. 22, 1946. L. PARKIN Re. 22,715

SLIDING CLASP FASTENER

Original Filed Jan. 26, 1942

Inventor

Leslie Parkin.

By Walter S. Jones

Attorney

Reissued Jan. 22, 1946

Re. 22,715

UNITED STATES PATENT OFFICE 22,715

SLIDING CLASP FASTENER

Leslie Parkin, Nottingham, England, assignor to United-Carr Fastener Corporation, Cambridge, Mass.

Original No. 2,341,331, dated February 8, 1944, Serial No. 428,213, January 26, 1942. Application for reissue February 9, 1944, Serial No. 521,728. In Great Britain February 24, 1941

8 Claims. (Cl. 24—205)

This invention relates to sliding clasp fasteners and more particularly to fasteners of this type wherein for the purpose of obtaining a quick opening movement the stringer tapes are adapted to be separated by a lateral pull on one of the tapes.

It is an object of the present invention to provide means whereby the slider may be readily removed from one of the stringer tapes when it is desired to separate them by a lateral pull.

According to the present invention a sliding clasp fastener is provided at the upper end of one of the tapes with a stop or end member which normally prevents the complete removal of the slider from the tape but which is adapted to be automatically displaced by continued pressure of the slider against it. The stop may comprise resilient means adapted to be overcome by a continued pull on the slider in a direction to open the fastener.

To enable the invention to be fully understood it will now be described with reference to the accompanying drawing, in which.

Figure 4:
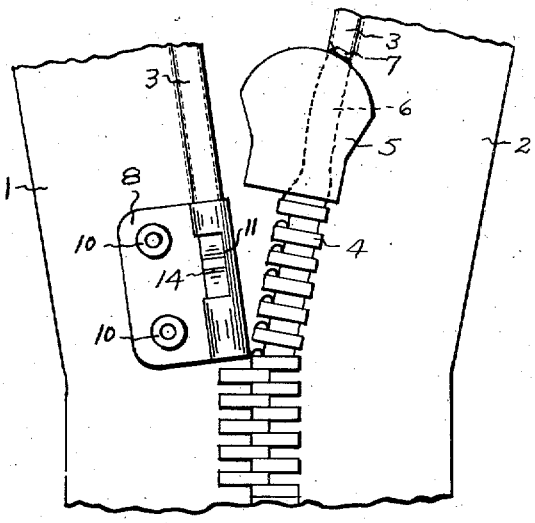
Fig. 4 is a view similar to Fig. 1 but with the slider pulled to released position.
Figure 5:
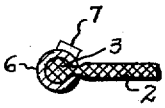
Fig. 5 is a section taken on the line 5—5 of Fig. 1.
Figure 6:
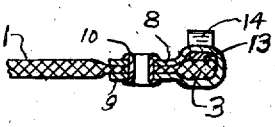
Fig. 6 is a section taken on the line 6—6 of Fig. 1.

As shown in the accompanying drawing, 1 and 2 are stringer tapes having beaded edges 3 to which are clamped fastener elements 4 adapted to be controlled by a slider 5 in a manner now well known to those skilled in the art. An end piece 6 is clamped to the tape 2 (Figs. 1 and 5) and is provided with a fixed projection 7 (Figs. 1, 4 and 5) which serves to prevent the complete removal of the slider from the tape 2, as shown in Fig. 4. The tape 1 has an end or stop member 8 secured thereto adjacent to the uppermost fastener element of the tape, and comprising a U-shaped sheet of metal (Fig. 6) the plate-like arms 8, 9 of which are secured by rivets 10 to opposite sides of the tape. The plate 8 is formed with an aperture 11. A strip of spring metal is assembled with the plate 8, the strip comprising flat end portions 12, 13 extending beneath the edges of the aperture 11 and a humped portion 14 projecting through the aperture above the face of the plate 8.

In this embodiment of the invention, when the slider is operated to close the fastener it is pulled in the normal way, by the pull tab shown in dotted lines (Figs. 1 and 4), until it engages the humped portion 14 and from this position the slider may be operated to open the fastener as desired. If the fastener is to be prepared for separation of the tapes by a lateral pull independently of the slider, a continued pull is applied upwardly on the slider in a direction against the hump 14 sufficient to cause the slider to flatten the humped portion 14 and pass over it, the ends 12, 13 being forced outwardly beneath the plate 8. The slider may thus be freed from the tape 1, after the slider passes beyond the stop member 8, by pulling the tape laterally outwardly from the edge of the slider, as shown in Fig. 4.

Figure 3:
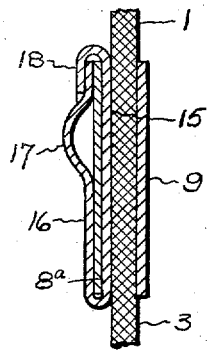
Fig. 3 is a similar view to Fig. 2 but showing a modified form of stop.

According to the modification shown in Fig. 3 the resilient stop comprises a U-shaped strip of spring metal, the lower arm 15 being inserted beneath the plate 8a and the upper arm 16 extending above the plate and having a humped portion 17 adapted to act as a resilient stop for the slider. The free end 18 of the arm 15 projects over the top edge of the plate 8 and forms a keeper for the free end of the arm 16.

Figure 1:
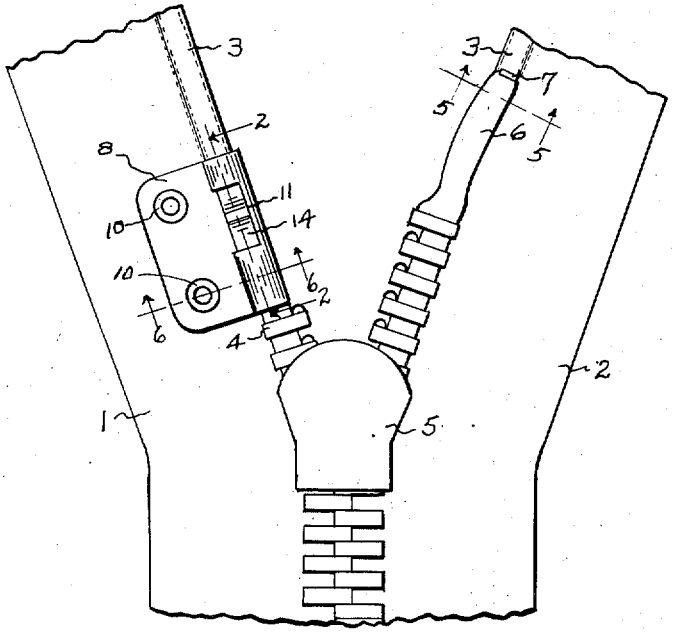
Fig. 1 is a plan view of the upper end of a sliding clasp fastener having a stop according to one embodiment of the invention arranged on one of the stringer tapes.
Figure 2:
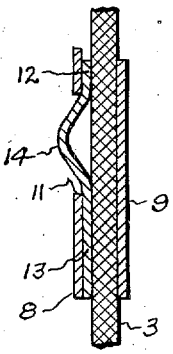
Fig. 2 is a section on the line 2—2 of Fig. 1.

The operation is similar to that of the stop described with reference to Fig. 1, the hump 17 serving as a stop for the slider but being adapted to be flattened upon continued pressure being exerted against it by the slider.

I claim:

1. A top stop member for a sliding clasp fastener which includes a pair of stringers, series of fasteners on adjacent edges of the stringers, a slider operable longitudinally relative to said stringers over the fasteners to engage and disengage them, said top stop member presenting an automatically depressible hump portion in the path of the slider to engage the slider and to limit ordinary movement thereof when pulled thereagainst, and said hump portion being depressed by said slider when a strong pull is exerted thereon thereby permitting said slider to pass to a position relative to said fasteners and stringers whereby the fasteners may be quickly separated from the closing end.

2. A top stop member for a sliding clasp fastener which includes a pair of stringers, series of fasteners on adjacent edges of the stringers, a slider operable longitudinally relative to said stringers over the fasteners to engage and disengage them, said top stop member presenting a humped spring portion in the path of the slider to limit ordinary movement of the slider when pulled thereagainst, and said hump portion being depressed by said slider when a strong pull is exerted thereon thereby permitting said slider to pass to a position relative to said fasteners and stringers whereby the fasteners may be quickly separated from the closing end.

3. A top stop member for a sliding clasp fastener which includes a pair of stringers, series of fasteners on adjacent edges of the stringers, a slider operable longitudinally relative to said stringers over the fasteners to engage and disengage them, said top stop member presenting a separate humped spring assembled therewith in line with the fastener elements on one stringer and in the path of the slider to limit ordinary movement of the slider when pulled thereagainst, and said hump portion being depressed by said slider when a strong pull is exerted thereon thereby permitting said slider to pass to a position relative to said fasteners and stringers whereby the fasteners may be quickly separated from the closing end.

4. In a sliding clasp fastener of the class described, a pair of stringers, series of fasteners on adjacent edges of the stringers, a slider operable longitudinally relative to said stringers over the fasteners to engage and disengage them and a member attached to one stringer at the closing end of the stringers for limiting the closing movement of said slider, said member presenting an automatically depressible hump portion in the path of the slider to limit ordinary movement of the slider when pulled thereagainst, and said hump portion being depressed by said slider when a strong pull is exerted thereon thereby permitting said slider to pass to a position relative to said fasteners and stringers whereby the fasteners may be quickly separated from the closing end and a slider stopping projection presented by one of the stringers to prevent the slider from being disassembled from the stringer when the fasteners are separated.

5. In a sliding clasp fastener of the class described, a pair of stringers, series of fasteners on adjacent edges of the stringers, a slider operable longitudinally relative to said stringers over the fasteners to engage and disengage them and a member attached to one stringer at the closing end of the stringers for limiting the closing movement of said slider, said member presenting an automatically depressible hump portion in the path of the slider to limit ordinary movement of the slider when pulled thereagainst, and said hump portion being depressed by said slider when a strong pull is exerted thereon thereby permitting said slider to pass to a position relative to said fasteners and stringers whereby the fasteners may be quickly separated from the closing end and an end piece on the other stringer constructed and arranged to permit movement of the slider relative to the said member on the other stringer while retaining the slider on the stringer having the end piece.

6. A top stop member for a sliding clasp fastener which includes a pair of stringers, series of fasteners on adjacent edges of the stringers, a slider operable longitudinally relative to said stringers over the fasteners to engage and disengage them, said top stop member being in the form of a sheet metal part folded over one edge of a stringer and a humped spring element held in assembled relation to that stringer by the sheet metal part in the path of the slider to limit ordinary movement of the slider when pulled thereagainst, and said hump portion of the spring being depressed by said slider when a strong pull is exerted thereon thereby permitting said slider to pass to a position relative to said fasteners and stringers whereby the fasteners may be quickly separated from the closing end in the manner described.

7. In a sliding clasp fastener of the class described, a pair of stringers, a series of fasteners on adjacent edges of the stringers, a slider member operable longitudinally relative to said stringers over the fasteners to engage and disengage them, an end member on one of said stringers adjacent to one end of a series of fasteners, and a yieldable spring portion carried by one of said members in a position to be in the path of the other member to engage therewith and limit ordinary movement of the slider member when pulled thereagainst, said yieldable spring portion being adapted to be displaced by the other member when a strong pull is exerted on said slider member, permitting said slider member to pass a position relative to said fasteners and end member whereby the fasteners may be quickly separated from the closing end.

8. In a sliding clasp fastener of the class described, a pair of stringers, a series of fasteners on adjacent edges of the stringers, a slider member operable longitudinally relative to said stringers over the fasteners to engage and disengage them, a stop member on one of said stringers for limiting the closing movement of said slider member, one of said members having a leaf spring presenting an automatically depressible portion in the path of the other member to limit ordinary movement of the slider member when pulled thereagainst, said depressible portion being depressed by the other member when a strong pull is exerted on said slider member, permitting said slider member to pass a position relative to said fasteners whereby the fasteners may be quickly separated from the closing end.

LESLIE PARKIN.